United States Patent [19]

Lippitsch

[11] Patent Number: 5,690,575
[45] Date of Patent: Nov. 25, 1997

[54] DIFFERENTIAL TRANSMISSION WITH INTEGRATED RANGE GEAR

[75] Inventor: Klaus Lippitsch, Graz, Austria

[73] Assignee: Steyr-Daimler-Puch AG, Vienna, Austria

[21] Appl. No.: 673,077

[22] Filed: Jul. 1, 1996

[30] Foreign Application Priority Data

Jul. 6, 1995 [DE] Germany ............ 195 24 682.9

[51] Int. Cl.$^6$ ................................. B60K 17/346
[52] U.S. Cl. ................................. 475/204
[58] Field of Search ................. 180/248, 249; 475/204, 206

[56] References Cited

U.S. PATENT DOCUMENTS

| | | | |
|---|---|---|---|
| 4,677,875 | 7/1987 | Batchelor | 180/248 |
| 4,793,210 | 12/1988 | Bucksch | 475/204 |
| 4,920,828 | 5/1990 | Kameda et al. | 475/204 |
| 5,443,426 | 8/1995 | Frost | 180/248 |

FOREIGN PATENT DOCUMENTS

| | | |
|---|---|---|
| 0684153 | 11/1995 | European Pat. Off. . |
| 1965530 | 7/1971 | Germany . |
| 3116242 | 5/1982 | Germany . |
| 3942069 | 6/1990 | Germany . |
| 4343953 | 7/1994 | Germany . |

OTHER PUBLICATIONS

New Venture Gear, Inc., Troy, MI 48083: Model 242 Transfer Case, Brochure 2903M/NVG032C (1990).

*Primary Examiner*—Dirk Wright
*Attorney, Agent, or Firm*—Karl Hormann

[57] ABSTRACT

A differential transmission incorporating a range gear box in the housing of which a first output shaft as well as a second output shaft disposed coaxially therewith are driven by an input shaft. To reduce the number of structural components, cost, size and weight, and to obtain optimum and easily variable ratios of gear diameters, the transmission is provided with a single planetary gear train the ring gear of which is drivingly connected to an input shaft. The planet carrier is drivingly connected to a first output shaft and is provided with pairs of meshing planet gears, one gear of each pair meshing with a sun gear which is selectively connectible with the planet carrier and/or a second output shaft, and with a second ring gear which is surrounding all the gears meshing with the sun gear and which is connectible with the housing.

7 Claims, 4 Drawing Sheets

DIFFERENTIAL TRANSMISSION WITH INTEGRATED RANGE GEAR

BACKGROUND OF THE INVENTION

1. Field of the Invention

The invention, in general, relates to a transfer case, and, more particularly, to a differential transmission with a range gear box, in the housing of which an input shaft drives a first output shaft and a second output shaft coaxial therewith, by a planetary gear train.

2. Background of the Invention

Differential transmissions incorporating a range gear box are used in cross-country vehicles to render them suitable for driving on roads as well as over the most difficult terrain. They may be found in every imaginable drive disposition, for instance in the longitudinal vehicular dimension, with axle drive shafts on the same or on different levels (offset), or transversely of a vehicle with any additional shaft formed as a hollow shaft.

Such a transmission is in principle known from German laid-open patent specification 1,965,530. It is provided with two serially connected separate planetary gear trains, the first one functioning as a range transmission, the other one as a differential, thus necessitating separate functional units for range shifting, differential locking, and for shifting to single axle drive, as the case may be. This results in a large number of structural components, a large size, heavy weight, high cost and rather a complex and complicated operation. With planetary gear trains further difficulties are encountered in the realization of the gear diameter ratios required for a desirable spread or steps of road and range gears and for a vehicle-specific optimum torque distribution between the axles.

This is also true of more recent known transmissions, such as the transfer box, Model 242, of New Venture Gear, Inc., of Troy, Mich. (see their 1990 brochure 2903M/NVG032C), or transmissions provided with output shafts on different levels as taught by German laid-open patent specification 4,343,953, or those provided with coaxial output shafts mounted below, as disclosed by German laid-open patent specification 3,942,069, or even in a transverse arrangement as shown in German patent 3,116,242.

OBJECTS OF THE INVENTION

It is, therefore, an object of the invention to provide a transmission of the general kind in which optimum diametrical ratios of gears may easily by varied.

A more specific object of the invention resides in the provision of a transmission of the kind referred to which can be manufactured from a minimum number of components.

Another object of the invention is to provide a transmission of the kind referred to which may be manufactured at low cost.

Still another object of the invention is to provide a compactly structured differential transmission with an integrated range gear box.

Last but not least, it is an object of the invention to provide a light weight but nevertheless rugged transmission of the general kind.

Other objects will in part be obvious and will in part occur hereinafter.

BRIEF SUMMARY OF THE INVENTION

In the accomplishment of these and other objects, the invention provides for a differential transmission with a range gear box and a single planetary gear train the ring gear of which is drivingly connected to an input shaft and the planet carrier of which is drivingly connected to a first output shaft. Preferably, the planet carrier supports pairs of planet gears meshing with each other. The sun gear of the planetary gear train may be selectively connected to the planet carrier and/or a second output shaft. Planet gears meshing with the sun gear are surrounded by, and are meshing with, an internal ring gear which is selectively moveable into engagement with the transmission housing to arrest its rotation.

BRIEF DESCRIPTION OF THE DRAWINGS

The novel features which are considered to be characteristic of the invention are set forth with particularity in the appended claims. The invention itself, however, in respect of its structure, construction, and lay-out, as well as manufacturing techniques, together with other objects and advantages thereof will be best understood from the ensuing description of the preferred embodiments, when read in connection with the appended drawing, in which:

DETAILED DESCRIPTION OF PREFERRED EMBODIMENTS

Figure 1:
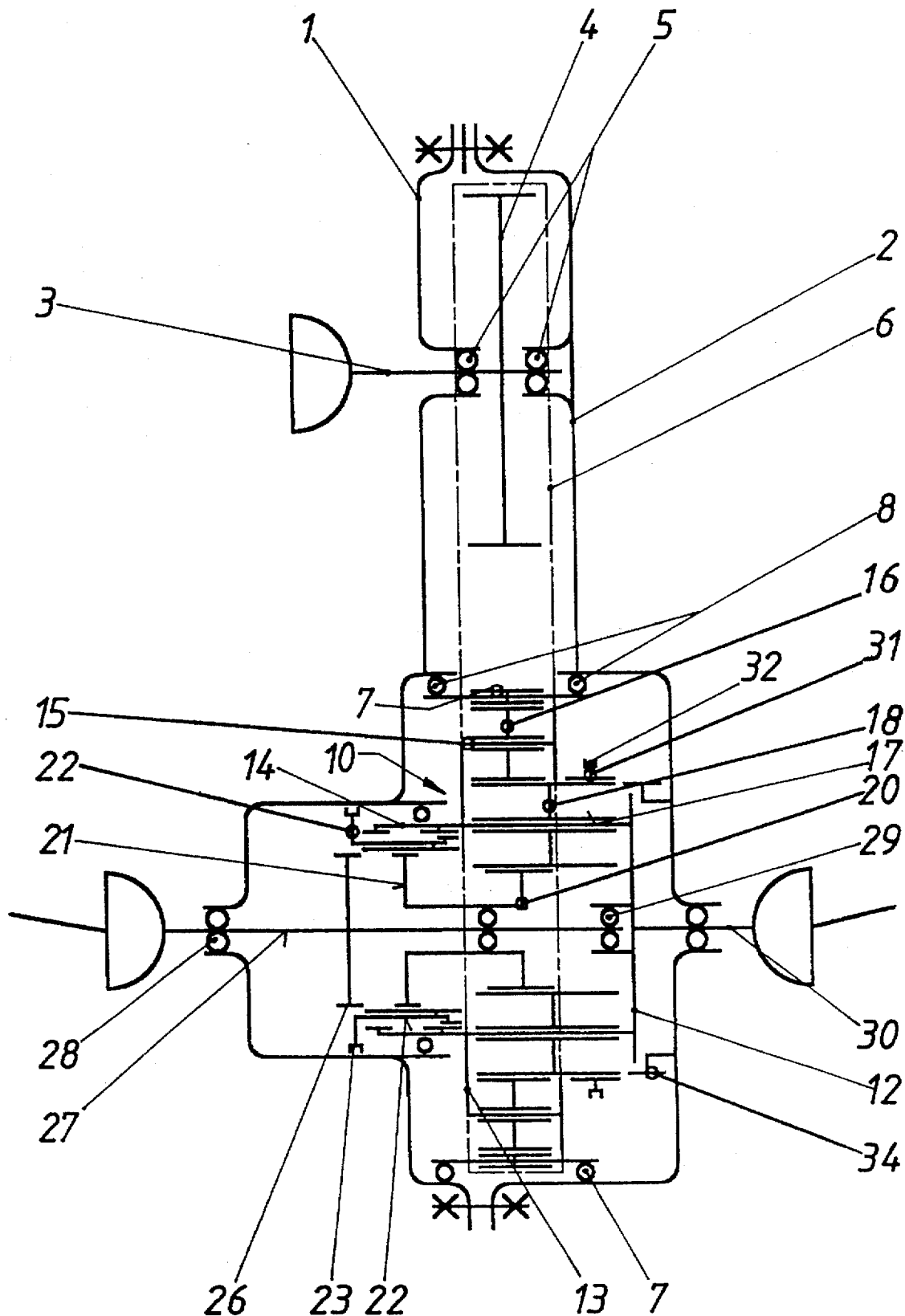
FIG. 1 schematically depicts a first preferred embodiment of a differential transmission in accordance with the invention.
Figure 2:
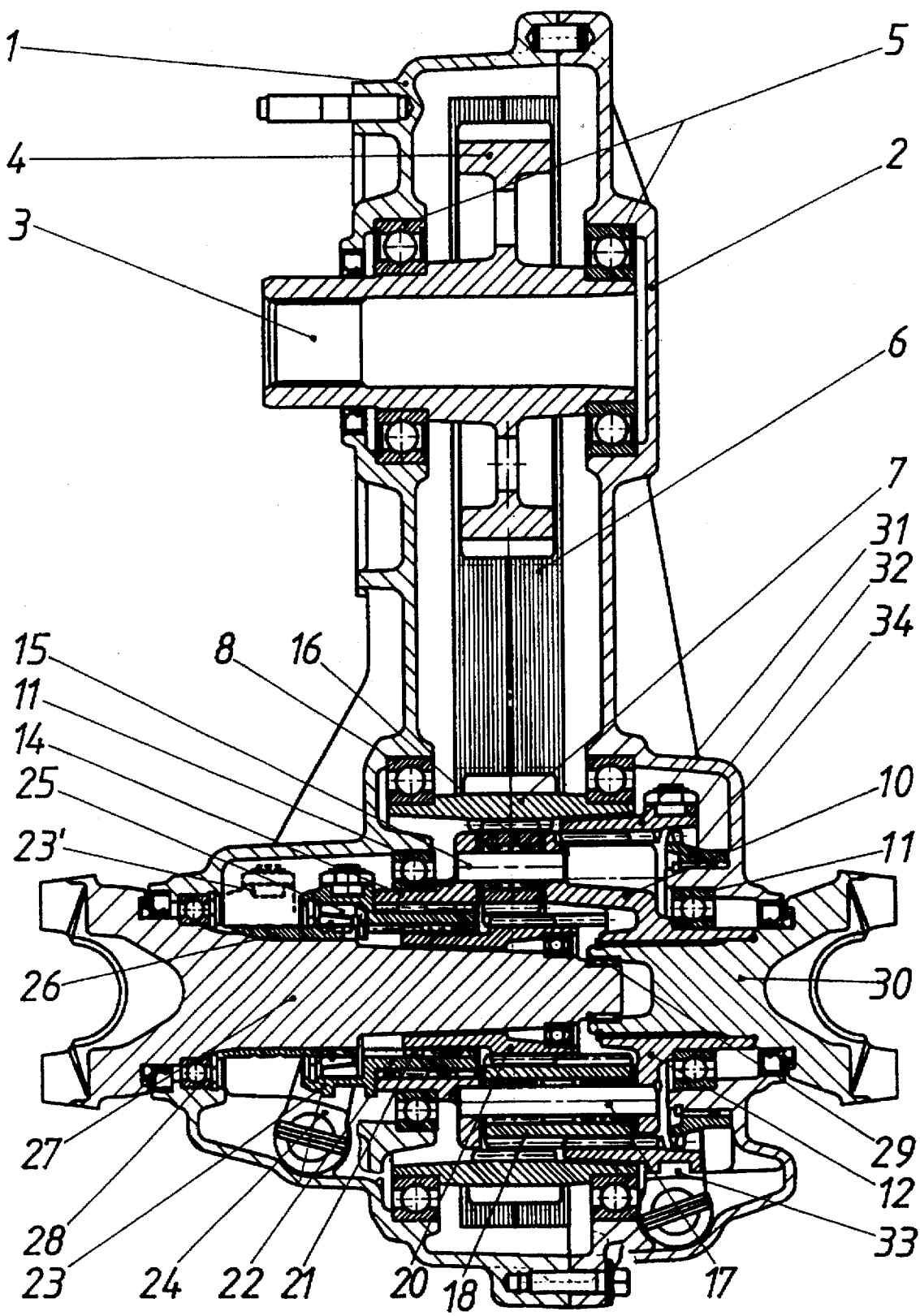
FIG. 2 is a view in vertical section of the transmission of FIG. 1.

In FIGS. 1 and 2, reference numerals 1 and 2 respectively designate forward and rear housing sections of a differential transmission in accordance with the invention. The transmission is part of a drive train which is aligned longitudinally of a vehicle. An input shaft 3 is driven by an engine and a shift gear box (neither shown). The input shaft 3 is journalled in roller bearings 5 seated in the housing sections 1 and 2, and is provided with an input gear 4. The input gear 4 drives an internally toothed gear 7 either by a tractive drive train such as a toothed chain 6 or the like, or by a direct gear train. The axial ends of the internal gear 7 are journalled in bearings 8 seated in the housing sections 1, 2. In many cases, the diameter of the internal gear 7 will be larger than the diameter of the input gear 4, thus providing a step-down transmission. Hence, at this primary transmission stage there is no increase in the load when operating in the range gear setting.

A planet carrier 10 is also journalled in bearings 11 seated in the housing sections 1 and 2. As shown, the planet carrier 10 consists of a rear bell-shaped member 12 and a front plate 13 with an internally toothed collar 14 projecting therefrom. The planet carrier 10 may also be an integral structure. Between the rear bell 12 and the front plate 13 there are provided first planet shafts 15 and, circumferentially displaced therefrom, second planet shafts 17. First planet gears 16 are meshing with the internal teeth of the gear 7 and are rotatably mounted on the planet shafts 15, and second planet gears 18 are rotatably mounted on the second planet shaft 17. The axial dimension of the planet gears 18 exceeds that of the planet gears 16. On the one hand the second planet gears 18 are meshing with the first planet gears 16, and on the other hand they are meshing with a sun gear 20. At one end the sun gear 20 forms an externally toothed collar 21 with axially narrow teeth.

An axially movable shift sleeve 22 shown in one of its terminal positions is provided with appropriate external and internal teeth and is mounted for sliding movement between the internally toothed collar 14 of the planet carrier 10 and the externally toothed collar 21 of the sun gear 20. The sleeve 22 projects out of the collar 14 to form a first shift ring 23 provided with an annular groove for receiving a first shift fork 24. The other terminal position of the shift sleeve 22 is shown in broken lines at 23' in FIG. 2. The shift sleeve 22 may be selectively moved to different positions by the first shift fork 24. Within the shift ring 23, there are provided further internal teeth 25 which may be moved into meshing engagement with an externally toothed sleeve 26. For ease of shifting while driving, between two-wheel and four-wheel operation, synchromesh may be provided instead of the internal teeth 25. The sleeve 26 may either be affixed to a second output shaft 27 or it may be formed by external teeth worked into the output shaft 27. The sun gear 20 is rotatably mounted on the second output shaft 27. The second output shaft 27 is journalled in a bearing 28 seated in the housing section 1 and in a needle bearing 29 seated in a coaxial first output shaft 30 which is keyed to the rear bell 12. Universal joints adapted to be connected to universal shafts (not shown) have been indicated at both output shafts 27 and 30. Such universal shafts would in turn connect to front and rear axles (also not shown) of a vehicle.

The bell 12 of the planet carrier 10 is provided with cut-outs to access that portion of the second planet gears 18 which is not surrounded by the internal gear 7. Each of the accessible portions is meshing with internal teeth of a ring gear 31 which is surrounding all of the second planet gears 18. The internally toothed ring gear 31 is provided with a second shift ring 32 engaged by a second shift fork 33. The ring gear 31 may thus be axially moved into and out of engagement with a stationary toothed ring 34 affixed to the housing section 2. The two shift forks 24 and 33 are pivotable about indicated axes and may be manipulated from the outside of the transmission.

Figure 3:
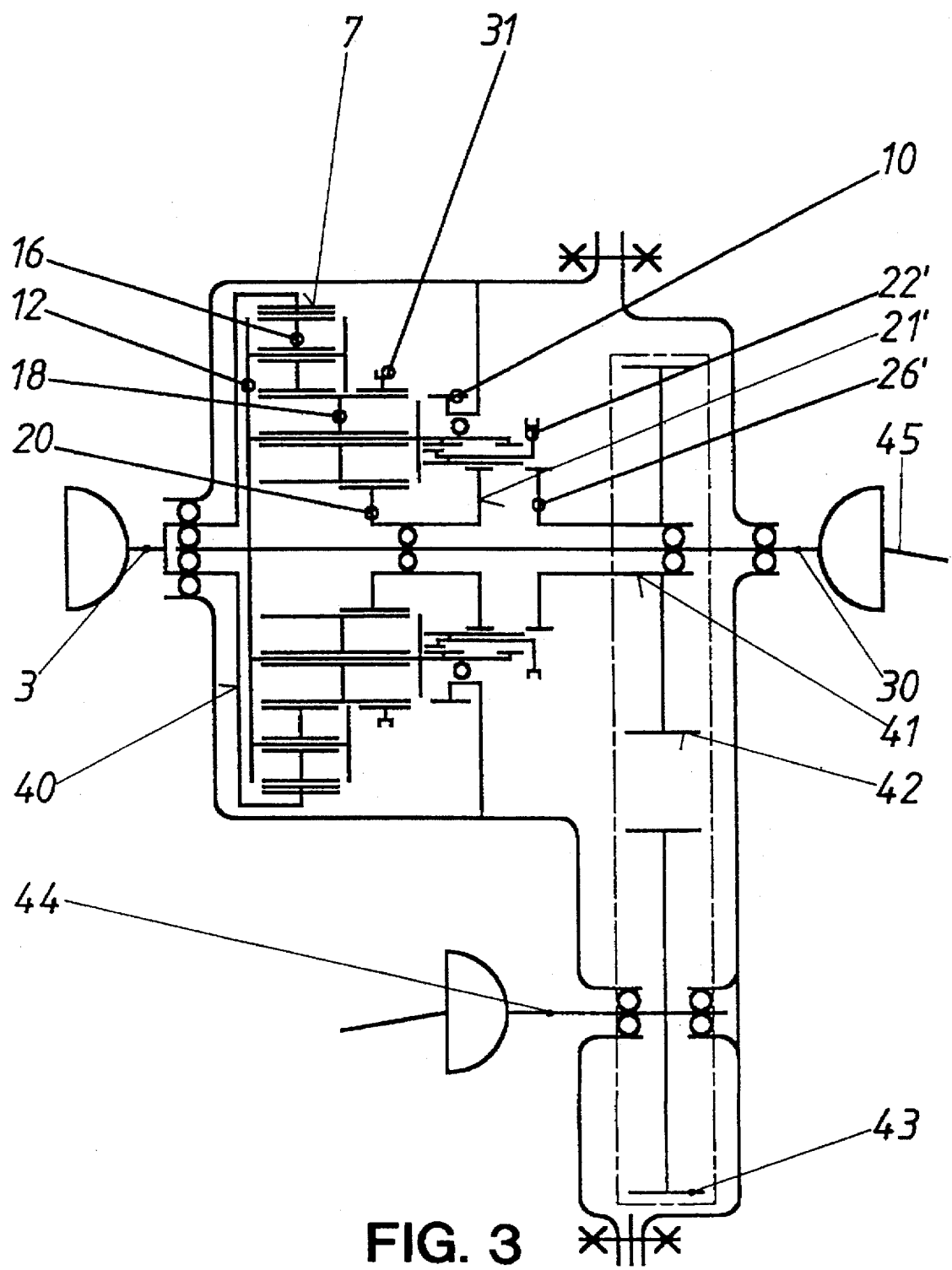
FIG. 3 schematically depicts of a second embodiment of a differential transmission in accordance with the invention.

FIG. 3 depicts a second embodiment of a transmission in accordance with the invention. It differs generally from the first embodiment by being disposed coaxially with respect to the input shaft 3, so that the first output shaft 30 which connects to a rear axle is arranged on the same level. To this end, the internal gear 7 is connected to the input shaft 3 by a flange plate 40, and the externally toothed collar 21', the shift sleeve 22' and the externally toothed sleeve 26' are disposed behind the planetary gear train. Therefore, a second output shaft 41 is a hollow shaft provided with a primary gear 42 which drives a secondary gear 43 by a toothed chain or the like, or by direct engagement. The secondary gear 43 is affixed to a secondary output shaft 44 adapted to be connected with a front axle.

Figure 4A:
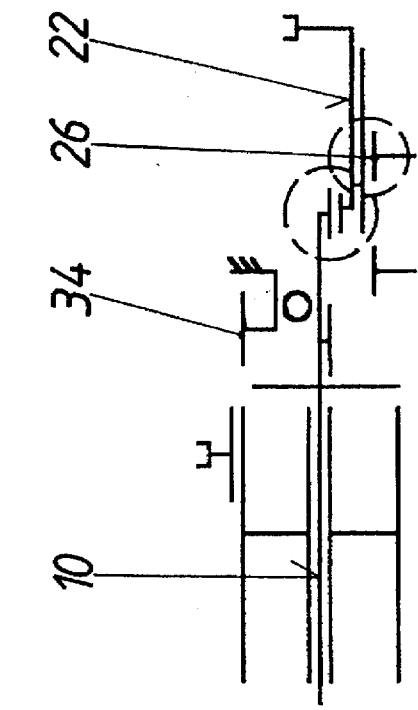
FIG. 4 depicts the five possible gear settings of the transmission of FIG. 1.

The operation will now be described with reference to different shift positions which are the same in either embodiment:

FIG. 4a: Shift position 2WD/HIGH indicates single-axle drive in a road gear setting. The sun wheel 20 is locked to the planet carrier 10 by the shift sleeve 22; as the output member or sleeve 26 of the second output shaft 27 is not coupled to the shift collar 22 it is disconnected. Any torque applied through the internal gear 7 is directly transferred to the planet carrier 10 and thus to the first output shaft 30, since the planetary gear train consisting of planet gears 16 and 18, sun wheel 20 and planet carrier 10 is locked and prevents any rolling motion. Therefore, in this shift position, i.e. the road gear setting, the transmission will run very quietly. The ring gear 31 which is coupled to the planet gears 18 also rotates without relative rolling motion.

Figure 4D:
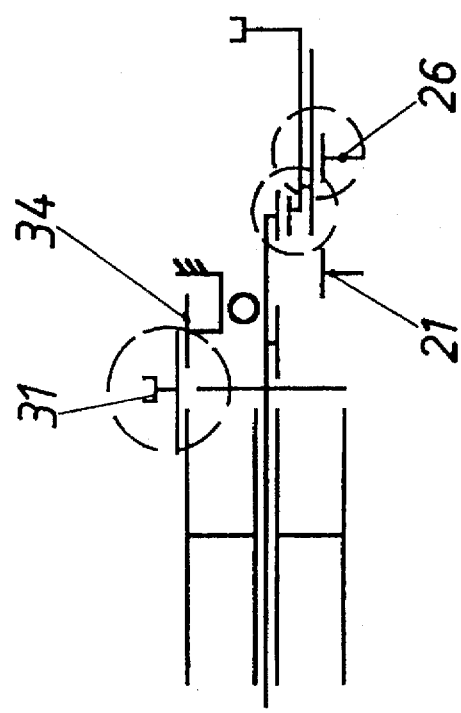
Figure 4B:
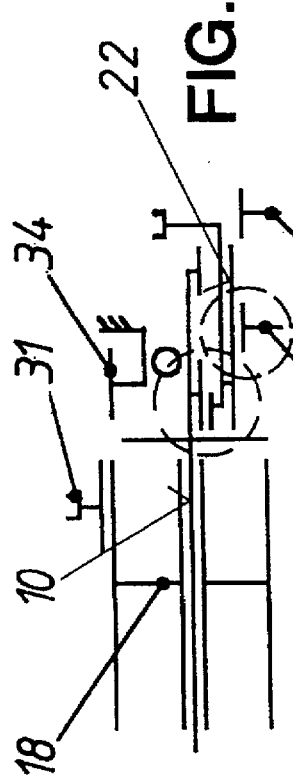

FIG. 4b: 4WD/HIGH/LOCK indicates four-wheel drive in road gear setting with the center differential locked. In its next shift position the shift sleeve 22 engages the output member or sleeve 26 and rigidly connects it to the planet carrier 10 and the sun gear 20. The torque path is the same as that in the FIG. 4a position, except that in this setting both the first output shaft 30 and the second output shaft 41 (27 in FIG. 1) are driven.

Figure 4E:
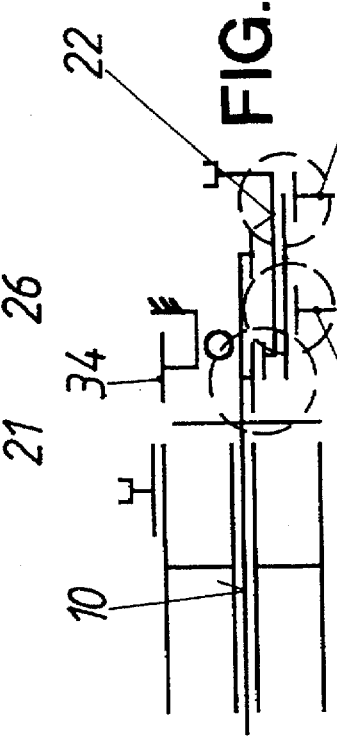
Figure 4C:
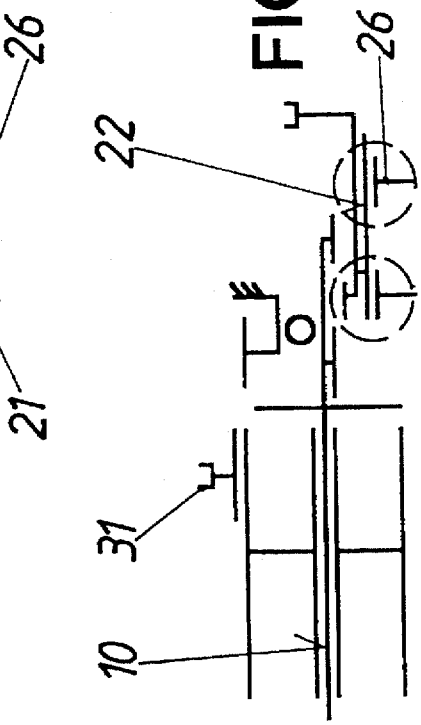

FIG. 4c: 4WD/HIGH/CD indicates four-wheel drive in a road gear setting with the center differential unlocked. By moving the shift sleeve 22 to its next position, the planet carrier 10 will be released, but the sun gear 20 and the output member 26 remain rigidly interconnected through the shift sleeve 22. The planetary gear train is no longer locked and functions as a conventional differential transmission. By a suitable lay-out of the number of teeth, different torque distributions may be provided over a wide range, even including split torque distribution patterns. The planet carrier 10 drives the first output shaft 30, the sun gear 20, and the output member 26 of the second output shaft 41 (27 in FIG. 1). In case of a difference between the number of revolutions of the two output members, the ring gear 31 may roll unimpededly and rotate freely.

FIG. 4d: NEUTRAL indicates the neutral setting. In the position of the shift sleeve 22 following next, the output member 26 is again connected to the planet carrier 10; but the sun wheel 20 is released. While the planetary gear train is rotated by the internal gear 7, the planetary gear train will idle without moving the drive members 30 and 26 since the sun wheel 20 is no longer restrained.

FIG. 4e: 4WD/LOW/LOCK indicates four-wheel drive in a cross-country setting with the center differential locked. To shift to this operating mode, the shift sleeve 22 is not moved; it remains in the neutral position. Instead, the ring gear 31 is moved to the right into locking engagement with the housing through the stationary toothed ring 34. The internal gear 7 will now drive the second planet gears 18 by way of the first planet gears 16. The planet gears 18 will roll along the stationary ring gear 31 to move the planet carrier 10 and, hence, the output members 30 and 26. At this time, the sun gear 20 is freely rotating. By this arrangement, step-down transmissions in the range of i=2 required or cross-country vehicles, may be attained.

In the manner described, different drive modes may be chosen in a reasonable manner, it being particularly advantageous that none of the shifting operations requires the shift members 22, 32 to be moved simultaneously, which significantly simplifies the actuation and operation of gear shifting.

The simplification and savings achieved by use of a single planetary drive train will be obvious to those skilled in the art. One of the meshing gears of each pair of planet gears is meshing with the internal gear, the other one is meshing with the sun gear. The diameters of the planet gears may thus be varied over a wide range without any need for varying the diameters of the internal gear or of the sun gear. Accordingly, selecting the diameter ratios necessary for a desired spread or gear steps and vehicle-specific optimum torque distribution, and their adaptation to various types of vehicles, are made simple by changing of the planet carrier and its planet gears. By selectively connecting the sun gear to the planet carrier and/or the second output shaft, the change-over from single-axle to dual-axle drive and the locking of the differential are accomplished in a sensible sequence by a shift member, followed by the change-over to range gear settings by connecting the ring gear to the housing.

In a preferred further improvement of the invention an internally toothed collar is provided on the planet carrier, an externally toothed collar is provided on the sun gear, and the second output shaft is provided with teeth, with an internally and externally toothed first shift sleeve being arranged for axial displacement between the two gears. The collars provide for and improved rotary bearing support for sun gear and planet carrier by enlarging the distance between the bearings. The shift sleeve is a self-centering relatively simple and very compact component.

Furthermore, in a preferred embodiment of the invention, the planet gears meshing with the sun gear are wider than the planet gears meshing with the internal gear. A toothed ring is affixed to the housing, and the ring gear is axially movable into and out of engagement with the teeth of the housing. Thus, the ring gear may, if necessary, be centered within the internal gear. The ring gear is also a relatively simple and inexpensive as well as compact component.

In a preferred embodiment of a transfer case disposed longitudinally of the vehicle and provided with output shafts on different levels (offset arrangement), the input shaft is driving the internal gear directly. The first output shaft is connected to a first axle drive shaft, and the second output shaft is constituted by a hollow shaft surrounding the first output shaft and is driving a lower second axle drive shaft.

In another preferred embodiment of a longitudinally disposed transfer case having output shafts on the same level, the internal gear is driven by rotary force applied to its outer circumference by an input shaft positioned above the internal gear, and the first and second output shafts extend from the housing on opposite sides thereof. This results in the added advantage of torque being raised in the cross-country gear setting only after it has been transmitted from the input shaft to the internal gear, which favorably affects the dimensioning of the input shaft, especially where it is connected to the internal gear by a chain drive or a similar tractive drive train.

It will be apparent to those skilled in the art that the invention provides for a transfer case of compact and light structure, improved shiftability and a reduced number of components.

What is claimed is:

1. A differential transmission with a range gear box, comprising:

housing means;

input shaft means;

first and second output shaft means;

planetary gear train means comprising first ring gear means drivingly connected to the input shaft means, planet carrier means drivingly connected to one of the first and second output shaft means, sun gear means selectively connectible with at least one of the planet carrier and the other of the first and second output shaft means, and a plurality of pairs of meshing planet gears, one gear of each pair meshing with the first ring gear means, the other gear of each pair meshing with the sun gear means;

second ring gear means meshing with the other planet gear of each pair; and means for selectively connecting the second ring gear means with the housing means.

2. The transmission of claim 1, wherein the planet carrier is provided with internally toothed means and the sun gear and second output shaft means are provided with externally toothed means and wherein internally and externally toothed shift means is mounted for axial movement intermediate the internally toothed means and the externally toothed means of the sun gear.

3. The transmission of claim 1, wherein the other planet gear of each pair is axially longer than the one planet gear of each pair and wherein toothed ring means is affixed to the housing means.

4. The transmission of claim 3, wherein the toothed ring means is axially aligned with the second ring gear means and wherein means is provided for axially moving the second ring gear means into and out of engagement with the toothed ring means.

5. The transmission of claim 1, wherein the first ring gear means is driven by the input shaft means and wherein the first output shaft means is adapted to be connected to an axle drive shaft and the second output shaft means is a hollow shaft means surrounding the first output shaft means adapted to drive a second axle drive shaft disposed on a lower level.

6. The transmission of claim 1, wherein the input shaft means is disposed above and in driving connection with the first ring gear means, and wherein the first and second output shaft means extend from the housing means in opposite directions thereof.

7. The transmission of claim 6, wherein the input shaft means is drivingly connected to the first ring gear means by one of chain and belt drive means.

* * * * *